(12) United States Patent
Dubagunta

(10) Patent No.: US 7,861,212 B1
(45) Date of Patent: Dec. 28, 2010

(54) SYSTEM, METHOD, AND COMPUTER READABLE MEDIUM FOR INTEGRATING AN ORIGINAL APPLICATION WITH A REMOTE APPLICATION

(76) Inventor: Saikumar V. Dubagunta, 8232 Fountain Ridge Dr., Plano, TX (US) 75025

( * ) Notice: Subject to any disclaimer, the term of this patent is extended or adjusted under 35 U.S.C. 154(b) by 652 days.

(21) Appl. No.: 11/086,121

(22) Filed: Mar. 22, 2005

(51) Int. Cl.
*G06F 9/44* (2006.01)

(52) U.S. Cl. ................................. 717/100; 717/106

(58) Field of Classification Search ............. 717/100, 717/106
See application file for complete search history.

(56) References Cited

U.S. PATENT DOCUMENTS

| | | |
|---|---|---|
| 4,714,995 A | 12/1987 | Materna et al. |
| 5,465,111 A | 11/1995 | Fukushima et al. |
| 5,495,533 A | 2/1996 | Linehan et al. |
| 5,524,253 A | 6/1996 | Pham et al. |
| 5,604,800 A | 2/1997 | Johnson et al. |
| 5,675,711 A | 10/1997 | Kephart et al. |
| 5,721,912 A | 2/1998 | Stepczyk et al. |
| 5,778,395 A | 7/1998 | Whiting et al. |
| 5,812,997 A | 9/1998 | Morimoto et al. |
| 5,859,911 A | 1/1999 | Angelo et al. |
| 5,930,798 A | 7/1999 | Lawler et al. |
| 5,982,891 A | 11/1999 | Ginter et al. |
| 6,038,500 A | 3/2000 | Weiss |
| 6,055,562 A | 4/2000 | Devarakonda et al. |
| 6,065,040 A | 5/2000 | Mima et al. |
| 6,088,689 A | 7/2000 | Kohn et al. |
| 6,113,650 A | 9/2000 | Sakai |
| 6,134,580 A | 10/2000 | Tahara et al. |
| 6,134,660 A | 10/2000 | Boneh et al. |
| 6,154,777 A | 11/2000 | Ebrahim |
| 6,172,986 B1 | 1/2001 | Watanuki et al. |
| 6,199,195 B1 | 3/2001 | Goodwin et al. |
| 6,202,060 B1 | 3/2001 | Tran |
| 6,209,124 B1 | 3/2001 | Vermeire et al. |
| 6,230,309 B1 | 5/2001 | Turner et al. |
| 6,233,601 B1 | 5/2001 | Walsh |
| 6,256,773 B1 | 7/2001 | Bowman-Amuah |
| 6,272,478 B1 | 8/2001 | Obata et al. |
| 6,282,563 B1 | 8/2001 | Yamamoto et al. |
| 6,282,697 B1 | 8/2001 | Fables et al. |

(Continued)

FOREIGN PATENT DOCUMENTS

JP    2005190103    7/2005

OTHER PUBLICATIONS

Emmerich, et al., "TIGRA—An Architectural Style for Enterprise Application Integration", *IEEE*, (Jul. 2001), p. 567-576.

(Continued)

*Primary Examiner*—Philip Wang

(57) ABSTRACT

A method, system, and computer readable medium for integrating an original application with a remote application comprises generating adapter classes related to the original application, generating proxy classes related to the remote application, wherein the proxy classes are adapted to communicate with the adapter classes, generating data types related to the remote application, wherein the data types related to the remote application are equivalent to data types related to the original application, and generating streamers related to the remote application, wherein the streamers related to the remote application are adapted to be utilized by the proxy classes.

20 Claims, 2 Drawing Sheets

U.S. PATENT DOCUMENTS

| | | |
|---|---|---|
| 6,304,556 B1 | 10/2001 | Haas |
| 6,330,677 B1 | 12/2001 | Madoukh |
| 6,343,265 B1 | 1/2002 | Glebov et al. |
| 6,349,343 B1 | 2/2002 | Foody et al. |
| 6,389,462 B1 | 5/2002 | Cohen et al. |
| 6,438,744 B2 | 8/2002 | Toutonghi et al. |
| 6,442,537 B1 | 8/2002 | Karch |
| 6,452,910 B1 | 9/2002 | Vij et al. |
| 6,477,372 B1 | 11/2002 | Otting et al. |
| 6,496,871 B1 | 12/2002 | Jagannathan et al. |
| 6,600,430 B2 | 7/2003 | Minagawa et al. |
| 6,600,975 B2 | 7/2003 | Moriguchi et al. |
| 6,611,516 B1 | 8/2003 | Pirkola et al. |
| 6,629,032 B2 | 9/2003 | Akiyama |
| 6,629,128 B1 | 9/2003 | Glass |
| 6,662,642 B2 | 12/2003 | Breed et al. |
| 6,671,680 B1 | 12/2003 | Iwamoto et al. |
| 6,687,761 B1 | 2/2004 | Collins et al. |
| 6,701,381 B2 | 3/2004 | Hearne et al. |
| 6,714,844 B1 | 3/2004 | Dauner et al. |
| 6,738,975 B1 | 5/2004 | Yee et al. |
| 6,744,352 B2 | 6/2004 | Lesesky et al. |
| 6,744,358 B1 | 6/2004 | Bollinger |
| 6,744,820 B1 | 6/2004 | Khairallah et al. |
| 6,768,417 B2 | 7/2004 | Kuragaki et al. |
| 6,816,452 B1 | 11/2004 | Maehata |
| 6,831,375 B1 | 12/2004 | Currie et al. |
| 6,851,108 B1 | 2/2005 | Syme |
| 6,862,443 B2 | 3/2005 | Witte |
| 6,876,845 B1 | 4/2005 | Tabata et al. |
| 6,879,570 B1 | 4/2005 | Choi |
| 6,895,391 B1 | 5/2005 | Kausik |
| 6,901,588 B1 | 5/2005 | Krapf et al. |
| 6,904,593 B1 | 6/2005 | Fong et al. |
| 6,931,455 B1 | 8/2005 | Glass |
| 6,931,623 B2 | 8/2005 | Vermeire et al. |
| 6,947,965 B2 | 9/2005 | Glass |
| 6,951,021 B1 | 9/2005 | Bodwell et al. |
| 6,957,439 B1 * | 10/2005 | Lewallen ............... 719/328 |
| 6,963,582 B1 | 11/2005 | Xu |
| 6,981,150 B2 | 12/2005 | Little et al. |
| 6,985,929 B1 | 1/2006 | Wilson et al. |
| 6,993,774 B1 | 1/2006 | Glass |
| 7,010,689 B1 | 3/2006 | Matyas, Jr. et al. |
| 7,043,522 B2 | 5/2006 | Olson et al. |
| 7,047,518 B2 | 5/2006 | Little et al. |
| 7,055,153 B2 | 5/2006 | Beck et al. |
| 7,058,645 B2 | 6/2006 | Seto et al. |
| 7,062,708 B2 | 6/2006 | Mani et al. |
| 7,069,551 B2 | 6/2006 | Fong et al. |
| 7,127,259 B2 | 10/2006 | Ueda et al. |
| 7,127,724 B2 | 10/2006 | Lewallen |
| 7,146,614 B1 | 12/2006 | Nikols et al. |
| 7,146,618 B1 | 12/2006 | Mein et al. |
| 7,172,113 B2 | 2/2007 | Olenick et al. |
| 7,174,533 B2 | 2/2007 | Boucher |
| 7,197,742 B2 | 3/2007 | Arita et al. |
| 7,210,132 B2 | 4/2007 | Rivard et al. |
| 7,213,227 B2 | 5/2007 | Kompalli et al. |
| 7,225,425 B2 | 5/2007 | Kompalli et al. |
| 7,228,141 B2 | 6/2007 | Sethi |
| 7,231,403 B1 | 6/2007 | Howitt et al. |
| 7,237,225 B2 | 6/2007 | Kompalli et al. |
| 7,293,261 B1 | 11/2007 | Anderson et al. |
| 7,376,959 B2 | 5/2008 | Warshavsky et al. |
| 7,475,107 B2 | 1/2009 | Maconi et al. |
| 7,477,897 B2 | 1/2009 | Bye |
| 7,496,637 B2 | 2/2009 | Han et al. |
| 7,499,990 B1 | 3/2009 | Tai et al. |
| 7,502,615 B2 | 3/2009 | Wilhoite et al. |
| 7,506,309 B2 | 3/2009 | Schaefer |
| 7,519,455 B2 | 4/2009 | Weiss et al. |
| 7,566,002 B2 | 7/2009 | Love et al. |
| 7,643,447 B2 | 1/2010 | Watanuki et al. |
| 7,660,777 B1 | 2/2010 | Hauser |
| 7,660,780 B1 | 2/2010 | Patoskie |
| 7,664,721 B1 | 2/2010 | Hauser |
| 7,698,243 B1 | 4/2010 | Hauser |
| 7,702,602 B1 | 4/2010 | Hauser |
| 7,702,603 B1 | 4/2010 | Hauser |
| 7,702,604 B1 | 4/2010 | Hauser |
| 7,774,789 B1 | 8/2010 | Wheeler |
| 7,810,140 B1 | 10/2010 | Lipari et al. |
| 7,823,169 B1 | 10/2010 | Wheeler |
| 7,840,513 B2 | 11/2010 | Hauser |
| 7,844,759 | 11/2010 | Cowin |
| 2001/0029526 A1 | 10/2001 | Yokoyama et al. |
| 2001/0051515 A1 | 12/2001 | Rygaard |
| 2001/0056425 A1 | 12/2001 | Richard |
| 2002/0032783 A1 * | 3/2002 | Tuatini ............... 709/229 |
| 2002/0035429 A1 | 3/2002 | Banas |
| 2002/0091680 A1 | 7/2002 | Hatzis et al. |
| 2002/0115445 A1 | 8/2002 | Myllymaki |
| 2002/0116454 A1 | 8/2002 | Dyla et al. |
| 2002/0159479 A1 | 10/2002 | Watanuki et al. |
| 2002/0174222 A1 | 11/2002 | Cox |
| 2002/0196771 A1 | 12/2002 | Vij et al. |
| 2003/0009539 A1 | 1/2003 | Hattori |
| 2003/0018950 A1 | 1/2003 | Sparks et al. |
| 2003/0023573 A1 | 1/2003 | Chan et al. |
| 2003/0033437 A1 | 2/2003 | Fischer et al. |
| 2003/0046377 A1 | 3/2003 | Daum et al. |
| 2003/0046432 A1 | 3/2003 | Coleman et al. |
| 2003/0051172 A1 | 3/2003 | Lordermann et al. |
| 2003/0055898 A1 | 3/2003 | Yeager et al. |
| 2003/0070071 A1 | 4/2003 | Riedel et al. |
| 2003/0101441 A1 | 5/2003 | Harrison et al. |
| 2003/0177170 A1 | 9/2003 | Glass |
| 2003/0191797 A1 | 10/2003 | Gurevich et al. |
| 2003/0191969 A1 | 10/2003 | Katsikas |
| 2003/0225789 A1 | 12/2003 | Bussler et al. |
| 2003/0225935 A1 * | 12/2003 | Rivard et al. ............ 709/328 |
| 2004/0003243 A1 | 1/2004 | Fehr et al. |
| 2004/0015539 A1 | 1/2004 | Alegria et al. |
| 2004/0037315 A1 | 2/2004 | Delautre et al. |
| 2004/0044985 A1 | 3/2004 | Kompalli et al. |
| 2004/0044986 A1 | 3/2004 | Kompalli et al. |
| 2004/0044987 A1 | 3/2004 | Kompalli et al. |
| 2004/0064503 A1 | 4/2004 | Karakashian et al. |
| 2004/0078423 A1 | 4/2004 | Satyavolu et al. |
| 2004/0078687 A1 | 4/2004 | Partamian et al. |
| 2004/0082350 A1 | 4/2004 | Chen et al. |
| 2004/0088369 A1 | 5/2004 | Yeager et al. |
| 2004/0111730 A1 | 6/2004 | Apte |
| 2004/0133656 A1 | 7/2004 | Butterworth et al. |
| 2004/0148073 A1 | 7/2004 | Hawig et al. |
| 2004/0172614 A1 * | 9/2004 | Gallagher ............... 717/108 |
| 2004/0194072 A1 | 9/2004 | Venter |
| 2004/0203731 A1 | 10/2004 | Chen et al. |
| 2004/0220952 A1 | 11/2004 | Cheenath |
| 2004/0221292 A1 | 11/2004 | Chiang et al. |
| 2005/0004727 A1 | 1/2005 | Remboski et al. |
| 2005/0030202 A1 | 2/2005 | Tsuboi |
| 2005/0090279 A9 | 4/2005 | Witkowski et al. |
| 2005/0114832 A1 * | 5/2005 | Manu ............... 717/106 |
| 2005/0141706 A1 | 6/2005 | Regli et al. |
| 2005/0144218 A1 | 6/2005 | Heintz |
| 2005/0163549 A1 | 7/2005 | Shima et al. |
| 2005/0172123 A1 | 8/2005 | Carpentier et al. |
| 2005/0246302 A1 | 11/2005 | Lorenz et al. |
| 2005/0256614 A1 | 11/2005 | Habermas |
| 2005/0256876 A1 | 11/2005 | Eidson |
| 2005/0262155 A1 | 11/2005 | Kress et al. |
| 2005/0281363 A1 | 12/2005 | Qi et al. |

| | | |
|---|---|---|
| 2006/0005177 A1 | 1/2006 | Atkin et al. |
| 2006/0031850 A1 | 2/2006 | Falter et al. |
| 2006/0040640 A1 | 2/2006 | Thompson et al. |
| 2006/0041337 A1 | 2/2006 | Augsburger et al. |
| 2006/0048145 A1 | 3/2006 | Celli et al. |
| 2006/0080646 A1 | 4/2006 | Aman |
| 2006/0090103 A1 | 4/2006 | Armstrong et al. |
| 2006/0111089 A1 | 5/2006 | Winter et al. |
| 2006/0112183 A1 | 5/2006 | Corson et al. |
| 2006/0121916 A1 | 6/2006 | Aborn et al. |
| 2006/0123396 A1 | 6/2006 | Fox et al. |
| 2006/0143600 A1 | 6/2006 | Cottrell et al. |
| 2006/0149746 A1* | 7/2006 | Bansod et al. ............... 707/10 |
| 2006/0167981 A1* | 7/2006 | Bansod et al. ............. 709/203 |
| 2006/0173857 A1 | 8/2006 | Jackson |
| 2006/0190931 A1 | 8/2006 | Scott et al. |
| 2006/0200494 A1 | 9/2006 | Sparks |
| 2006/0206864 A1 | 9/2006 | Shenfield et al. |
| 2006/0220900 A1 | 10/2006 | Ceskutti et al. |
| 2006/0221901 A1 | 10/2006 | Yaqub et al. |
| 2006/0245406 A1 | 11/2006 | Shim |
| 2006/0256008 A1 | 11/2006 | Rosenberg |
| 2006/0272002 A1 | 11/2006 | Wightman et al. |
| 2007/0004432 A1 | 1/2007 | Hwang et al. |
| 2007/0015495 A1 | 1/2007 | Winter et al. |
| 2007/0026871 A1 | 2/2007 | Wager |
| 2007/0103292 A1 | 5/2007 | Burkley et al. |
| 2007/0112773 A1 | 5/2007 | Joyce |
| 2007/0223432 A1 | 9/2007 | Badarinath |
| 2007/0243880 A1 | 10/2007 | Gits et al. |
| 2008/0077667 A1 | 3/2008 | Hwang et al. |
| 2010/0161543 A1 | 6/2010 | Hauser |
| 2010/0223210 A1 | 9/2010 | Patoskie |
| 2010/0235459 A1 | 9/2010 | Wheeler |

OTHER PUBLICATIONS

Bussler, Christoph "The Role of B2B Engines in B2B Integration Architectures", *ACM*, (Mar. 2002),67-72.

Jandl, et al., "Enterprise Application Integration by means of a generic CORBA LDAP Gateway", *ACM*, (May 2002),711.

Sutherland, et al., "Enterprise Application Integration and Complex Adaptive Systems", *ACM*, (Oct. 2002),59-64.

Ballance, et al., "The Pan Language-Based Editing System for Integrated Development Environments", *ACM*, (Oct. 1990),77-93.

Dilts, et al., "An Inteligent Interface to CIM Multiple Data Bases", *ACM, TALIP*, (Mar. 2004), vol. 3 Issue 1, pp. 491-509.

"Non Final Office Action", U.S. Appl. No. 11/086,211, 25 pages.

"Requirement for Restriction/Election", U.S. Appl. No. 11/086,102, (Apr. 6, 2009), 7 pages.

"Non Final Office Action", U.S. Appl. No. 10/975,827, (Apr. 7, 2009),38 pages.

"Final Office Action", U.S. Appl. No. 11/086,120, (Apr. 14, 2009),48 pages.

"Non Final Office Action", U.S. Appl. No. 11/645,292, (Apr. 17, 2009),40 pages.

"Final Office Action", U.S. Appl. No. 11/052,680, (Feb. 13, 2009),117 pages.

Flanagan, Roxy "Graphic + Internet related tutorials Using Winzip", indexed by www.archive.org,(Oct. 30, 2008),8 pages.

"Non Final Office Action", U.S. Appl. No. 11/645,190, (Mar. 13, 2009),41 pages.

"Non Final Office Action", U.S. Appl. No. 11/645,291, (Mar. 13, 2009),41 pages.

"Non Final Office Action", U.S. Appl. No. 11/645,193, (Mar. 16, 2009),41 pages.

"Notice of Allowance", U.S. Appl. No. 11/086,101, (Mar. 23, 2009),20 pages.

"Non Final Office Action", U.S. Appl. No. 11/052,680, (May 6, 2009),28 pages.

"Non Final Office Action", U.S. Appl. No. 11/645,300, (May 11, 2009),21 pages.

"Non Final Office Action", U.S. Appl. No. 11/645,302, (May 11, 2009),21 pages.

"Stuffit Deluxe", Aladdin Systems,(Jan. 1, 2004),83 pages.

Gu, T. et al., "Toward an OSGi-based infrastructure for context-aware applications", U.S. Appl. No. 11/645,190, Pervasive Computing IEEE, vol. 3, Issue 4. Digital Object Identifier 10.1109/MPRV.2004.19,(Oct.-Dec. 2004),9 pages.

Pantic, M et al., "Simple agent framework: an educational tool introducing the basics of AI programming", U.S. Appl. No. 11/645,190, Information Technology: Research and Education, 2003. Proceedings. ITRE2003.,(Aug. 11-13, 2003),426-430.

Singh, V.K. et al., "DYSWIS: An architecture for automated diagnosis of networks", U.S. Appl. No. 11/645,190, Operations and Management Symposium, 2008. NOMS 2008. IEEE,(Apr. 7-11, 2008),851-854.

"Non Final Office Action", U.S. Appl. No. 10/975,146, (May 26, 2009),21 pages.

"Final Office Action", U.S. Appl. No. 10/975,827, (Nov. 23, 2009), 17 pages.

"Final Office Action", U.S. Appl. No. 11/086,120, (Feb. 23, 2010), 43 pages.

"Final Office Action", U.S. Appl. No. 11/495,053, (Mar. 17, 2010), 17 pages.

"Final Office Action", U.S. Appl. No. 10/975,146, (Dec. 1, 2009), 11 pages.

"Non-Final Office Action", U.S. Appl. No. 11/052,680, (Feb. 4, 2010), 12 pages.

"Non-Final Office Action", U.S. Appl. No. 11/086,101, (Sep. 2, 2009), 20 pages.

"Non-Final Office Action", U.S. Appl. No. 11/086,102, (Mar. 5, 2010), 15 pages.

"Non-Final Office Action", U.S. Appl. No. 11/439,059, (Oct. 30, 2009), 9 pages.

"Non-Final Office Action", U.S. Appl. No. 11/495,053, (Jun. 10, 2009), 13 pages.

"Non-Final Office Action", U.S. Appl. No. 11/645,197, (Feb. 24, 2010), 13 pages.

"Non-Final Office Action", U.S. Appl. No. 11/645,301, (Jan. 6, 2010), 25 pages.

"Non-Final Office Action", U.S. Appl. No. 11/645,303, (Feb. 8, 2010), 18 pages.

"Non-Final Office Action", U.S. Appl. No. 10/975,623, (Nov. 12, 2009), 8 pages.

"Notice of Allowance", U.S. Appl. No. 10/975,623, (Feb. 23, 2010), 9 pages.

"Notice of Allowance", U.S. Appl. No. 11/086,101, (Feb. 25, 2010), 9 pages.

"Notice of Allowance", U.S. Appl. No. 11/645,292, (Nov. 17, 2009), 9 pages.

"Notice of Allowance", U.S. Appl. No. 11/645,300, (Nov. 18, 2009), 9 pages.

"Notice of Allowance", U.S. Appl. No. 11/645,302, (Nov. 17, 2009), 8 pages.

"Notice of Allowance", U.S. Appl. No. 11/645,306, (Nov. 17, 2009), 8 pages.

"Restriction Requirement", U.S. Appl. No. 11/645,191, (Jan. 28, 2010), 7 pages.

"Restriction Requirement", U.S. Appl. No. 11/645,192, (Jan. 28, 2010), 6 pages.

"Restriction Requirement", U.S. Appl. No. 11/645,198, (Jan. 28, 2010), 6 pages.

"Restriction Requirement", U.S. Appl. No. 11/645,200, (Feb. 26, 2010), 8 pages.

Blackwell, John "Remit—Rule-Based Alert Management Information Tool", *Thesis Florida State University College of Arts and Sciences*, (2004),pp. 1-69.

Forte, "Feature Comparison of Agent and Free Agent", Retrieved from: <www.forteinc.com/agent/features.php> on Jan. 26, 2010, (2002), 3 pages.

Lockemann, Peter C., "Agents and Databases: Friends or Foes?", *Proceedings of the 9th International Database Engineering& Application Symposium(IDEAS '05)*, (2005), 11 pages.

Russell, Stuart et al., "Artificial Intelligence: A Modern Approach", *Pearson*, (2003), pp. 5, 32-56, 449-454.

Stallings, William "ISDN and Broadband ISDN with Frame Relay and ATM", *Prentice-Hall*, (1999), 5 pages.

"Advisory Action", U.S. Appl. No. 11/086,120, (May 4, 2010), 3 pages.

"Final Office Action", U.S. Appl. No. 11/052,680, (May 17, 2010), 11 pages.

"Final Office Action", U.S. Appl. No. 11/645,301, (May 12, 2010), 31 pages.

"Final Office Action", U.S. Appl. No. 11/645,303, (May 21, 2010), 31 pages.

"Non Final Office Action", U.S. Appl. No. 10/975,827, (Mar. 25, 2010), 19 pages.

"Non Final Office Action", U.S. Appl. No. 11/439,059, (Mar. 26, 2010), 6 pages.

"Non Final Office Action", U.S. Appl. No. 11/645,191, (May 5, 2010), 15 pages.

"Non Final Office Action", U.S. Appl. No. 11/645,192, (May 4, 2010), 13 pages.

"Non Final Office Action", U.S. Appl. No. 11/645,194, (Mar. 26, 2010), 26 pages.

"Non Final Office Action", U.S. Appl. No. 11/645,196, (Apr. 28, 2010), 29 pages.

"Non Final Office Action", U.S. Appl. No. 11/645,198, (Apr. 12, 2010), 12 pages.

"Non-Final Office Action", U.S. Appl. No. 11/645,195, (Apr. 15, 2010), 20 pages.

Adnan, Syed et al., "A Survey of Mobile Agent Systems", CSE 221, Final Project, Jun. 13, 2000., 12 pages.

Baumann, J. et al., "Mole 3.0: A Middleware for Java-Based Mobile Software Agents", (1998), 18 pages.

Bigus, J.P. et al., "ABLE: A toolkit for building multiagent autonomic systems", IBM Systems Journal, vol. 41, No. 3, 2002., 22 pages.

Brandt, Raimund "Dynamic Adaptation of Mobile Code in Heterogenous Environments", Der Teschnischen Universitat Munchen,(Feb. 15, 2001), 76 pages.

Brazier, F.M.T. et al., "Generative Migration of Agents", Department of Computer Science, Faculty of Sciences, Vrije Universiteit Amsterdam; de Boelelaan 1081a 1081 HV Amsterdam, The Netherlands {frances, bjo, steen, niek} @cs.vu.l,(Aug. 2002(, 4 pages.

Bursell, Michael et al., "Comparison of autonomous mobile agent technologies", (May 12, 1997), 28 pages.

Christopoulou, Eleni et al., "An ontology-based context management and reasoning process for UbiComp applications", Research Academic Computer Technology Institute, Research Unit 3, Design of Ambient Information Systems Group, N. Kazantzaki str., Rio Campus, 26500, Patras, Greece {hristope, goumop, kameas} @cti.gr,(Oct. 2005), 6 pages.

Hasegawa, Tetsou et al., "Inoperability for mobile agents by incarnation agents", AAMAS; Melbourne, Australia; ACM, 1-58113-683, pp. 1006-1007,(Jul. 14, 2033), 2 pages.

Jih, Wan-Rong et al., "Context-aware Access Control in Pervasive Healthcare", Computer Science and Information Engineering, National Taiwan University, Taiwan. jih@agents.csie.ntu.edu.tw., {r93070, yjhsu} @csie.ntu.edu.tw,(2005), 8 pages.

Pauline, Siu Po Lam "Context-Aware State Management for Supporting Mobility in a Pervasive Environment", A thesis submitted to The University of Hong Kong in fulfillment of the thesis requirement for the degree of Master of Philosophy.,(Aug. 2004), 106 pages.

Qui-Sheng, He et al., "A Lightweight Architecture to Support Context-Aware Ubiquitous Agent System", Department of Computer Science and Engineering, Fudan University, Shanghai 200433, Chain {hequisheng, sltu} @fudan.edu.cn,(Aug. 2006), 6 pages.

Sterritt, Roy et al., "From Here to Autonomicity: Self-Managing Agents and the Biological Metaphors that Inspire Them", Integrated Design and Process Technology, pp. 143-150.,(Jun. 2005), 8 pages.

Yu, Ping et al., "Mobile Agent Enabled Application Mobility for Pervasive Computing", Internet and Mobile Computing Lab, Department of Computing, Hong Kong Polytechnic University, Hung Hom, Kowloon, Hong Kong {cspyu, csjcao, cswen} @comp.polyu.edu.hk. ,(Aug. 2006), 10 pages.

"Advisory Action", U.S. Appl. No. 11/052,680, (Jul. 28, 2010), 3 pages.

"Advisory Action", U.S. Appl. No. 11/645,303, (Jul. 28, 2010), 3 pages.

"Final Office Action", U.S. Appl. No. 10/975,827, (Sep. 15, 2010), 22 pages.

"Final Office Action", U.S. Appl. No. 11/645,192, (Sep. 15, 2010), 14 pages.

"Final Office Action", U.S. Appl. No. 11/645,194, (Sep. 15, 2010), 28 pages.

"Non Final Office Action", U.S. Appl. No. 11/645,301, (Jul. 30, 2010), 18 pages.

"Non Final Office Action", U.S. Appl. No. 11/645,303, (Aug. 19, 2010), 20 pages.

"Non-Final Office Action", U.S. Appl. No. 12/647,964, (Sep. 8, 2010), 5 pages.

"Notice of Allowance", U.S. Appl. No. 11/495,053, (Aug. 31, 2010), 7 pages.

"The Sims", *Sims, Electronic Arts*, (2000), 57 pages.

"WOW, World of Warcraft", Wikipedia (online), Retrieved from Internet in 2010, <URL:http://en.wikipedia.org/wiki/World_of_Warcraft>, (2010), 28 pages.

Barba, Rick "The Sims Prima's Official Strategy Guide", *Prima Publishing; ISBN: 7615-2339-1*, (2000), 98 Pages.

Chang, Yao-Chung et al., "All-IP Convergent Communications over Open Service Architecture", *2005 Wireless Telecommunications Symposium, IEEE, 0-7803-8856*, (2005), pp. 202-210.

Erfurth, Christian et al., "Migration Intelligence for Mobile Agents", U.S. Appl. No. 11/645,192 on Sep. 15, 2010, (2001), 8 pages.

Hinchey, Michael G., et al., "Formal Approaches to Agent-Based Systems", *2nd International Workshop FAABS*, (Oct. 2002), 291 pages.

Taylor, T.L. "Does WoW Change Everything?", *Games and Culture*, vol. 1, No. 4, (Oct. 2006), 20 pages.

"Advisory Action", U.S. Appl. No. 11/495,053, (May 26, 2010), 3 pages.

"Final Office Action", U.S. Appl. No. 11/086,102, (Jul. 1, 2010), 14 pages.

"Final Office Action", U.S. Appl. No. 11/645,197, (Jul. 19, 2010), 16 pages.

"Non Final Office Action", U.S. Appl. No. 11/645,200, (May 26, 2010), 34 pages.

"Notice of Allowability", U.S. Appl. No. 10/975,146, (Jul. 13, 2010), 2 pages.

"Notice of Allowance", U.S. Appl. No. 11/439,059, (Jul. 14, 2010), 12 pages.

Bagci, et al., "Communication and Security Extensions for a Ubiquitous Mobile Agent System (UbiMAS)", *In Proceedings of CF 2005*, Available at <http://portal.acm.org/ft_gateway.cfm?id=1062302&type=pdf&coll=GUIDE&dl=GUIDE&CFID=91857573&CFTOKEN=53726080>,(May 2005), pp. 246-251.

Karnik, Neeran M., et al., "Security in the Ajanta Mobile Agent System", Softw. Pract. Exper. 31, 4 (Apr. 2001), 301-329,(2001), 28 pages.

Korba, Larry "Towards Secure Agent Distribution and Communication", In Proceedings of the 32nd Annual Hawaii International Conference on System Science—vol. 8 (Jan. 5-8, 1999). HICSS. IEEE Computer Society, Washington, DC, 8059,(1999), 10 pages.

Poggi, Agostino et al., "Security and Trust in Agent-Oriented Middleware", OTM Workshops 2003: 989-1003,(2003), 15 pages.

Rosenberg, Jonathan et al., "Programming Internet Telephony Services", *IEEE Network*, (May/Jun. 1999), 8 pages.

Walsh, Tom et al., "Security and Reliability in Concordia", In Mobility: Processes, Computers, and Agents ACM Press/Addison-Wesley Publishing Co., New York, NY, 524-534.,(1999), 10 pages.

"Non Final Office Action", U.S. Appl. No. 11/086,102, (Jun. 2, 2009), 18 pages.

"Non Final Office Action", U.S. Appl. No. 11/645,306, (Jun. 4, 2009), 19 pages.

"Non Final Office Action", U.S. Appl. No. 10/975,623, (Jun. 9, 2009), 6 pages.

"Non Final Office Action", U.S. Appl. No. 11/086,1201, (Aug. 13, 2009), 35 pages.

"Notice of Allowance", U.S. Appl. No. 11/645,190, (Sep. 17, 2009), 8 pages.

"Notice of Allowance", U.S. Appl. No. 11/645 193, (Sep. 17, 2009), 8 pages.

"Final Office Action", U.S. Appl. No. 11/052,680, (Oct. 5, 2009), 16 pages.

"Final Office Action", U.S. Appl. No. 11/086,102, (Oct. 20, 2009), 13 pages.

"Final Office Action", U.S. Appl. No. 11/086,211, (Sep. 29, 2009), 18 pages.

"Notice of Allowance", U.S. Appl. No. 11/645,291, (Oct. 1, 2009), 11 pages.

Praet, et al., "Processor Modeling and Code Selection for Retargetable Compilation", Jul. 2001, *ACM, TODAES* vol. 6, Issue 3, pp. 277-307.

"Advisory Action", U.S. Appl. No. 11/645,197, (Oct. 6, 2010), 3 pages.

"Final Office Action", Application 10/21/10, (Oct. 21, 2010), 34 pages.

"Final Office Action", U.S. Appl. No. 11/645,191, (Oct. 28, 2010), 19 pages.

"Final Office Action", U.S. Appl. No. 11/645,196, (Sep. 22, 2010), 33 pages.

"Final Office Action", U.S. Appl. No. 11/645,198, (Sep. 16, 2010), 22 pages.

"Notice of Allowance", U.S. Appl. No. 11/645,195, (Oct. 7, 2010), 8 pages.

"Notice of Allowance", U.S. Appl. No. 12/714,753, (Sep. 27, 2010), 7 pages.

* cited by examiner

SYSTEM, METHOD, AND COMPUTER READABLE MEDIUM FOR INTEGRATING AN ORIGINAL APPLICATION WITH A REMOTE APPLICATION

CROSS-REFERENCE TO RELATED APPLICATIONS

The present application is related to U.S. patent application Ser. No. 11/086,101, entitled SYSTEM, METHOD, AND COMPUTER READABLE MEDIUM FOR INTEGRATING AN ORIGINAL APPLICATION WITH A REMOTE APPLICATION, U.S. patent application Ser. No. 11/086,211, entitled SYSTEM, METHOD, AND COMPUTER READABLE MEDIUM FOR INTEGRATING APPLICATIONS IN MULTIPLE LANGUAGES, U.S. patent application Ser. No. 11/086,120, entitled SYSTEM, METHOD, AND COMPUTER READABLE MEDIUM FOR INTEGRATING AN ORIGINAL LANGUAGE APPLICATION WITH A TARGET LANGUAGE APPLICATION, and U.S. patent application Ser. No. 11/086,102, entitled SYSTEM, METHOD, AND COMPUTER READABLE MEDIUM FOR NORMALIZING SOURCE FILES IN MULTIPLE SOFTWARE LANGUAGES, the disclosures of which are incorporated in their entirety by reference herein.

BACKGROUND OF THE INVENTION

The present invention is related to integrating applications, and, more specifically to a system and method for integrating an original application with a remote application.

Various limitations are associated with integrating applications such as difficulty in sharing the structure of application data and application programming interfaces (classes). As such, it is cumbersome for an application written in one language or in an original application to access a functionality provided by an application written in a different language or a remote application. It is currently tedious to integrate these applications because a common structure must be defined in a third language (such as Extensible Markup Language, Common Object Request Broker Architecture Event Definition Language, etc.).

The present invention overcomes these problems and limitations by providing a system and method for integrating an original application with a remote application.

SUMMARY OF THE INVENTION

The present invention comprises a system, method, and computer readable medium for an original application with a remote application. In one embodiment, a method for integrating an original application with a remote application comprises generating adapter classes related to the original application, generating proxy classes related to the remote application, wherein the proxy classes are adapted to communicate with the adapter classes, generating data types related to the remote application, wherein the data types related to the remote application are equivalent to data types related to the original application, and generating streamers related to the remote application, wherein the streamers related to the remote application are adapted to be utilized by the proxy classes.

In another embodiment, a method for integrating an original application with a remote application comprises generating proxy classes related to the remote application, generating data types related to the remote application, wherein the data types related to the remote application are equivalent to data types related to an original application, and generating streamers related to the remote application, wherein the streamers related to the remote application are adapted to be utilized by the proxy classes.

In a further embodiment, a computer readable medium comprises instructions for: generating at least one proxy class related to a remote application, generating at least one data type related to the remote application, and generating at least one streamer related to the remote application, wherein the data type related to the remote application is equivalent to at least one data type related to an original application, and wherein the streamer is adapted to be utilized by the proxy class.

In yet another embodiment, a computer readable medium comprises instructions for: generating at least one of: a proxy class, a data type, and a streamer, each related to a remote application, wherein the data type related to the remote application is equivalent to at least one data type related to an original application.

In yet a further embodiment, a system for integrating an original application with a remote application comprises a first module adapted to generate adapter classes related to an original application, a second module adapted to generate proxy classes related to a remote application, wherein the first module and the second module are operably coupled, the second module adapted to generate data types related to the remote application, and the second module adapted to convert data communication between the proxy classes and the adapter classes.

In yet another embodiment, a module for integrating an original application with a remote application, wherein the module is adapted to: generate adapter classes related to an original application, wherein the adapter classes are adapted to provide access to functions of the original application, provide data from the adapter classes to a remote application, and receive converted data by the adapter class from the remote application, wherein the data is converted into a neutral data format.

In yet a further embodiment, a module for integrating an original application with a remote application, wherein the module is adapted to: generate proxy classes related to a remote application, generate data types related to the remote application, and convert data communication between the proxy classes and an original application, generate streamers related to the remote application, wherein the streamers are adapted to: convert data communicated by the proxy classes to the original application and convert data communicated by the original application to the proxy classes, wherein the data is converted into a neutral data format.

DETAILED DESCRIPTION OF THE INVENTION

Figure 1:
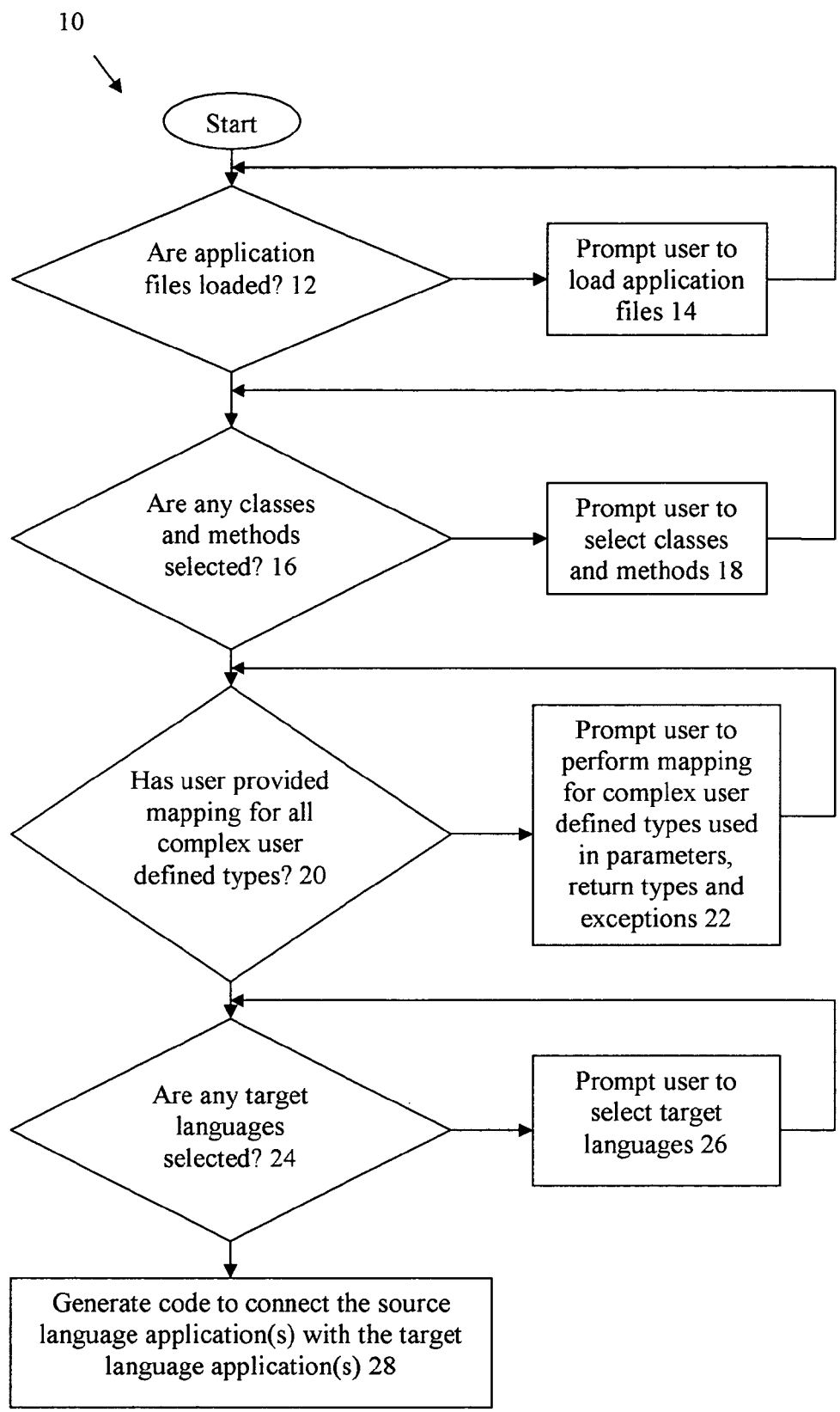
FIG. 1 depicts a flow chart describing connecting a source language application with a target language application in accordance with an embodiment of the present invention.

FIG. 1 depicts a flow chart 10 that describes steps involved in connecting a source language application with a target language application. A software program implementing the current invention is started and at step 12, it is determined if application files are loaded. In one embodiment, it is determined if application files in an original (source) language are loaded into the program. This determination is preferably performed by software of the present invention but can be performed by a user. If the files are not loaded, the software and/or user are prompted to load the application files at step 14. In one embodiment, a prompt to load the original source files into the program is received. The software program normalizes the definitions in the original source files that are loaded. Definitions include classes, methods, structures and other software program constructs. If the files are loaded, it is determined if any classes and methods are selected at step 16. In one embodiment, the software program checks to see if the user has selected any classes and/or methods in the original source files. The selected methods and classes will be exported to target language applications.

If they are not selected, the software and/or user are prompted to select the classes, methods, and other constructs in the program at step 18. If they are selected, it is determined if mapping for all complex user defined types is provided at step 20. In one embodiment, the software program verifies the selected constructs against all target languages. The software program identifies the mapping of the constructs in the original source language to the target language. If the mapping is not provided, the software and/or user are prompted to perform the mapping for all complex user defined types used in parameters, return types, and exceptions in step 22. In one embodiment, if the construct is complex in nature and has no equivalent in a target language, the software program prompts the user to provide a mapping for the construct. If the mapping is provided, it is determined if any target languages are selected at step 24. If they are not selected, the software and/or user are prompted to select the target languages at step 26. If they are selected, software is generated to connect the source language application with the target language application(s) at step 28. The generated code consists of adapters on the source language side to export existing source language application objects. The generated code consists of proxies on the target language side to provide access to source language application objects.

In one embodiment, a method for integrating an original application with a remote application comprises generating adapter classes related to the original application, generating proxy classes related to the remote application, wherein the proxy classes are adapted to communicate with the adapter classes, generating data types related to the remote application, wherein the data types related to the remote application are equivalent to data types related to the original application, and generating streamers related to the remote application, wherein the streamers related to the remote application are adapted to be utilized by the proxy classes. The communication comprises sending input parameters, related to the original application, to the adapter classes, receiving at least one of: output parameters, return values, and exceptions, related to the original application, at the proxy classes, receiving at least one of: input parameters, related to the original application, at the adapter classes, and sending at least one of: output parameters, return values, and exceptions, related to the original application, to the proxy classes.

The method further comprises providing access to functions of the original application by the adapter classes, converting data communicated by the proxy classes to the adapter classes and by the adapter classes to the proxy classes, by the streamers related to the remote application, into a neutral data format, and receiving the data by the streamers in neutral data format and converting the data to corresponding data types.

Figure 2:
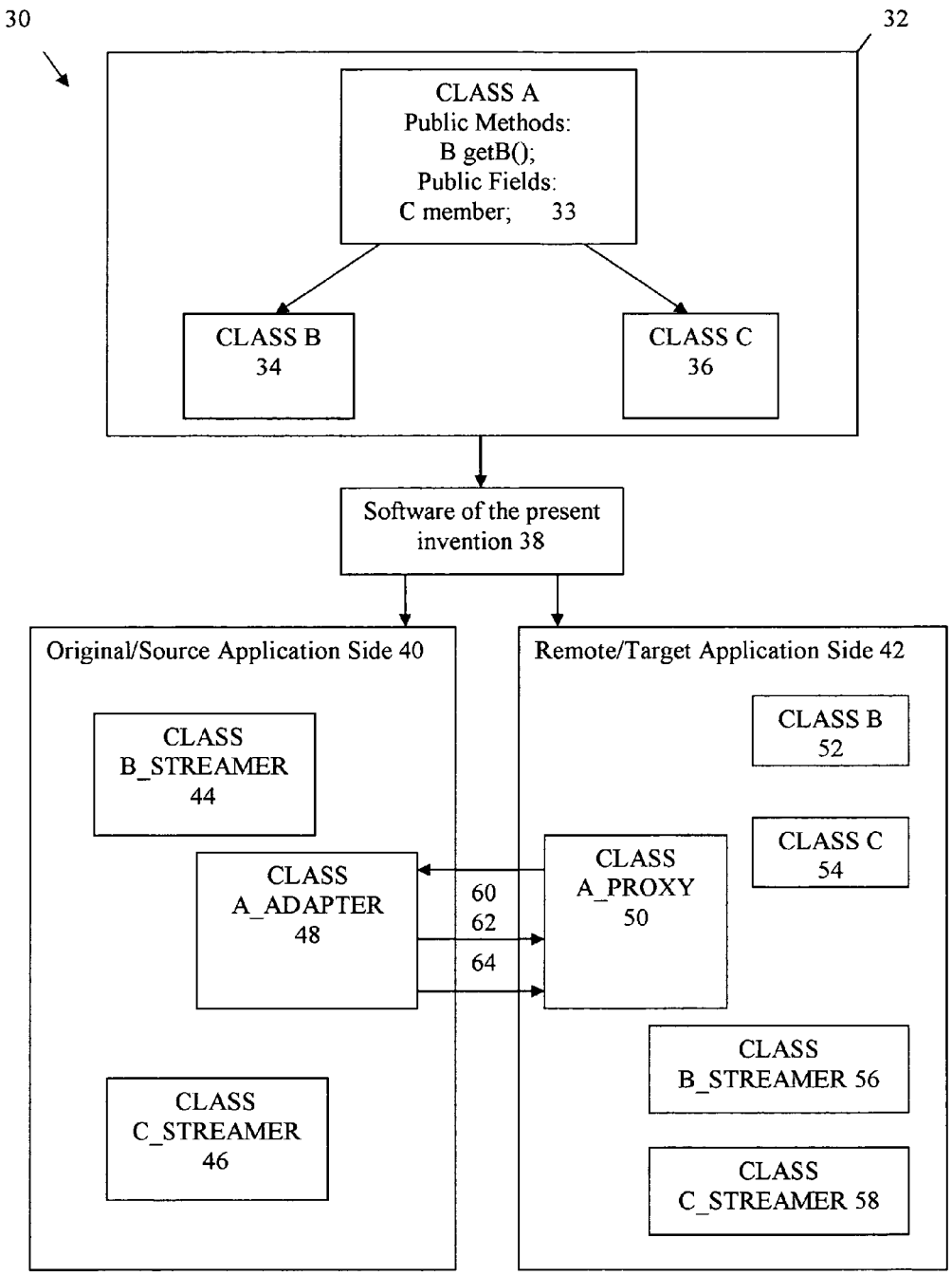
FIG. 2 depicts a flow diagram describing messaging between a source application and a target application in accordance with an embodiment of the present invention.

FIG. 2 depicts a flow diagram 30 of the present invention. An input source file 32 in the original language, that includes a plurality of classes 33-36, is loaded into the software program implementing the current invention. Class 33 (or Class A) is a business class and classes 34 and 36 are data classes used by the business class. More specifically, Class A is an application class that is exported by the user. The application class consists of a method, for example, getB() and a member. Class B is a data class that is used as a result type by the method in the application Class A and Class C is a data class that is used as the type of a member in the application Class A. In this example, class 34 is used as a result of a method, class 36 is used as a public member, and class 33 is a class that is of interest to remote applications.

The input file 32 is imported into an application 38 (which is a software program implementing the current invention) that generates files or classes 44-48 on an original or source application side 40 and files or classes 50-58 on a remote or target application side 42. The streamer class 44 is generated for Class B which is used as the return type for the getB() method in Class A, while the streamer class generated for Class C is used as the type of the member in Class A. The Adapter class 48 is generated for Class A that provides target language applications to invoke the getB() method and access the member of original source application objects. The input file 32, the application 38, the source application side 40 and the target application side 42 may fully and/or partially reside on a client, a server, and/or a client and a server.

A proxy class 50 (related to the target language) sends a request 60 to an adapter class 48 (related to the original language), and a response 62 and an exception 64 are received by the proxy class 50. The request 60, the response 62, and the exception 64 are sent generally based on data types 52 and 54 related to the target language, streamers 56 and 58 related to the target language, and streamers 44 and 46 related to the original language. More specifically, the proxy class 50 is generated for the Class A to be used in the target language applications as a proxy for the original source application objects. The proxy class 50 contains a getB() method, an access for a member and a mutator for the member.

The Class B 52, is an equivalent class for Class B 34 in the original source language that forms the return type of the getB() method in the proxy, while the Class C 54 is an equivalent class for Class C 36 in the original source language that is used in the accessor and mutator for the member. The streamer classes 56 and 58 are streamer classes generated for the generated Class B and Class C, respectively.

The target language application 42 communicates with the source language application by invoking the getB() method on the proxy class. The method invocation causes the generated code to create a data packet 60 containing the intent of the target language application 42 to invoke the getB() method on the source language application 40 object. The packet 60 is transferred to the source language application 40. The source language application adapter 48 receives the packet 60 and invokes the method on the original source language application object. The return data of the method is returned as a response packet 62 to the target language application 42. If an exception occurs during the invocation of the method on the original source language application object, the exception data of the method is returned as a exception packet 64 to the target language application 42.

In one embodiment, a system for integrating an original application with a remote application comprises a first module adapted to generate adapter classes related to an original application, a second module adapted to generate proxy classes related to a remote application, wherein the first module and the second module are operably coupled, the second module adapted to generate data types related to the remote application, and the second module adapted to convert data communication between the proxy classes and the adapter classes, wherein the adapter classes are adapted to provide access to functions of the original application, wherein the second module is adapted to generate streamers related to the remote application, wherein the streamers related to the remote application are adapted to: convert data communicated by the proxy classes to the adapter classes, and convert data communicated by the adapter classes to the proxy classes, wherein the data is converted into a neutral data format, and wherein the streamers are adapted to receive the data in the neutral data format and convert the data to corresponding data types.

The communication comprises sending input parameters, related to the original application, to the adapter classes, receiving at least one of: output parameters, return values, and exceptions, related to the original application, at the proxy classes, receiving at least one of: input parameters, related to the original application, at the adapter classes, and sending at least one of: output parameters, return values, and exceptions, related to the original application, to the proxy classes.

Although an exemplary embodiment of the system and method of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the functionality performed by the input file 32, the application 38, the source application side 40 and the target application side 42, can be performed by one or more of the input file 32, the application 38, the source application side 40 and the target application side 42 in a distributed architecture and on or via any electronic device. Further, such functionality may be performed by depicted and/or un-depicted contents of the input file 32, the application 38, the source application side 40 and the target application side 42.

What is claimed is:

1. One or more computer-readable storage media having instructions stored thereon that, in response to execution by a computing device, cause the computing device to perform operations comprising:

causing a prompt to be presented that enables selection of one or more target languages;

receiving an indication of a selected target language of the one or more target languages;

determining whether one or more constructs in an original language are selected;

in response to determining that the one or more constructs in the original language are not selected, causing a prompt to be presented that enables the one or more constructs in the original language to be selected;

after receiving an indication of the prompt being presented that enables the one or more constructs in the original language to be selected, receiving an indication of a selection of the one or more constructs in the original language;

determining whether a mapping of the one or more constructs in the original language to one or more constructs in the selected target language are provided;

in response to determining that the mapping of the one or more constructs in the original language to one or more constructs in the selected target language are not provided, causing a prompt to be presented that enables the mapping to be provided;

after receiving an indication of the prompt being presented that enables the mapping to be provided, receiving input of the mapping of the one or more constructs in the original language to the one or more constructs in the selected target language;

generating proxy classes related to the selected target language, wherein the proxy classes are adapted to communicate with one or more adapter classes of the original language, one or more of the proxy classes including an accessor method and a mutator method for a class member of the original language;

generating, by one or more of the proxy classes, data types related to the selected target language, wherein the data types related to the selected target language are equivalent to data types related to the original language and one or more of the data types are based on the mapping of the one or more constructs in the original language to the one or more constructs in the selected target language; and generating streamers related to the selected target language, wherein the streamers related to the selected target language are adapted to be utilized by the proxy classes to integrate an original language application written in the original language with a target language application written in the selected target language.

2. The one or more computer-readable storage media of claim 1, wherein the operations further comprise providing access to functions of the original language application by the one or more adapter classes.

3. The one or more computer-readable storage media of claim 1, wherein the operations further comprise:

converting data communicated from the one or more adapter classes to the proxy classes, wherein the data is converted at least in part by the streamers related to the selected target language.

4. The one or more computer-readable storage media of claim 3, wherein the operations further comprise converting the data communicated from the one or more adapter classes to the proxy classes into a neutral data format.

5. The one or more computer-readable storage media of claim 4, wherein the operations further comprise receiving the data communicated from the one or more adapter classes to the proxy classes by the streamers in neutral data format and converting the data to corresponding data types.

6. The one or more computer-readable storage media of claim 1, wherein the operations further comprise sending input parameters, related to the original language application, to the one or more adapter classes.

7. The one or more computer-readable storage media of claim 1, wherein the operations further comprise receiving at least one of: output parameters, return values, or exceptions, related to the original language application, at the proxy classes.

8. The one or more computer-readable storage media of claim 1, wherein the operations further comprise causing the target language application to invoke a method of the original language application.

9. The one or more computer-readable storage media of claim 8, wherein the operations further comprise receiving return data that results from an invocation of the method of the original language application.

10. A system embodied on one or more tangible computer-readable media and executable by a computing device, the system comprising at least one module configured to:

cause a prompt to be presented enabling selection of one or more target languages;

receive an indication of a selected target language from the one or more target languages;

determine whether one or more constructs in an original language are selected;

responsive to a determination that the one or more constructs in the original language are not selected, cause a prompt to be presented that enables the one or more constructs in the original language to be selected;

after receiving an indication of the prompt being presented that enables the one or more constructs in the original language to be selected, receive an indication of a selection of the one or more constructs in the original language;

determine whether a mapping of the one or more constructs in the original language to one or more constructs in the selected target language are provided;

responsive to determining that the mapping of the one or more constructs in the original language to the one or more constructs in the selected target language are not provided, cause a prompt to be presented that enables the mapping to be provided;

after receiving an indication of the prompt being presented that enables the mapping to be provided, receive input of the mapping of the one or more constructs in the original language to the one or more constructs in the selected target language;

generate one or more proxy classes related to the selected target language, the one or more proxy classes including an accessor method and a mutator method for an original language;

generate data types related to the selected target language, wherein the data types are generated based at least in part on the mapping of the one or more constructs in the original language to the one or more constructs in the selected target language; and convert data communication between the one or more proxy classes and one or more adapter classes of the original language to cause a target language application written in the selected target language to invoke a method of an original language application.

11. The system of claim 10, wherein the adapter classes of the original language are configured to provide access to functions of the original language application.

12. The system of claim 10, wherein the module is configured to generate streamers related to the selected target language.

13. The system of claim 12, wherein the streamers related to the selected target language are configured to:
convert data communicated by the one or more proxy classes to the one or more adapter classes; and
convert data communicated by the one or more adapter classes to the one or more proxy classes.

14. The system of claim 13, wherein the module is further configured to convert one or more of the data communicated by the one or more proxy classes or the data communicated by the one or more adapter classes into a neutral data format.

15. The system of claim 14, wherein the streamers are adapted to receive one or more of the data communicated by the one or more proxy classes or the data communicated by the one or more adapter classes in the neutral data format and convert the data to corresponding data types.

16. The system of claim 10, wherein the module is further configured to send input parameters, related to the original language, to the one or more adapter classes.

17. The system of claim 10, wherein the module is further configured to receive at least one of: output parameters, return values, or exceptions, related to the original language application, at the one or more proxy classes.

18. The system of claim 10, wherein the module is further configured to receive a response packet generated by the original language application in response to an invocation of the method of the original language application.

19. The system of claim 10, wherein the module is further configured to receive an exception packet generated by the original language application in response to the occurrence of an exception during an invocation of the method of the original language application.

20. A module stored on one or more tangible computer-readable media and executable by a computing device to cause the computing device to perform a method comprising:
causing a prompt to be presented enabling selection of one or more target languages;
receiving an indication of a selected target language from among the one or more target languages;
determining whether one or more constructs in an original language are selected;
in response to determining that the one or more constructs in the original language are not selected, causing a prompt to be presented that enables the one or more constructs in the original language to be selected;
after receiving an indication of the prompt being presented that enables the one or more constructs in the original language to be selected, receiving an indication of a selection of the one or more constructs in the original language;
determining whether a mapping of the one or more constructs in the original language to one or more constructs in the selected target language are provided;
in response to determining that the mapping of the one or more constructs in the original language to one or more constructs in the selected target language are not provided, causing a prompt to be presented that enables the mapping to be provided;
after receiving an indication of the prompt being presented that enables the mapping to be provided, receiving input of the mapping of the one or more constructs in the original language to the one or more constructs in the selected target language;
generating proxy classes related to the selected target language, one or more of the proxy classes including an accessor method and a mutator method for a class member of one or more methods of an original language application written in the original language;
generating data types related to the selected target language, wherein generating the data types is based on the mapping of the one or more constructs in the original language to the one or more constructs in the selected target language;
converting data communication between the proxy classes and the original language application;
generating streamers related to the selected target language, wherein the streamers are adapted to: convert data communicated by the proxy classes to the original language application and convert data communicated by the original language application to the proxy classes, wherein the data is converted into a neutral data format; and
causing a target language application written in the selected target language to invoke the one or more methods of the original language application utilizing one or more of the streamers.

* * * * *

UNITED STATES PATENT AND TRADEMARK OFFICE
CERTIFICATE OF CORRECTION

| | | |
|---|---|---|
| PATENT NO. | : 7,861,212 B1 | Page 1 of 1 |
| APPLICATION NO. | : 11/086121 | |
| DATED | : December 28, 2010 | |
| INVENTOR(S) | : Dubagunta | |

It is certified that error appears in the above-identified patent and that said Letters Patent is hereby corrected as shown below:

Title Page 3, item (56), under "Other Publications", in Column 1, Line 9, delete "Inteligent" and insert -- Intelligent --.

Title Page 4, item (56), under "Other Publications", in Column 1, Line 36, delete "Teschnischen" and insert -- Technischen --.

Title Page 4, item (56), under "Other Publications", in Column 1, Line 52, delete "2033)," and insert -- 2003), --.

Title Page 4, item (56), under "Other Publications", in Column 2, Line 20, delete "Retreived" and insert -- Retrieved --.

Title Page 5, item (56), under "Other Publications", in Column 1, Line 16, after "Issue 3," insert -- (Jul. 2001) --.

Title Page 5, Item (56), under "Other Publications", in Column 2, Line 3, delete "Application 10/21/10," and insert -- U.S. Appl. No. 11/645,200, --.

Signed and Sealed this
Nineteenth Day of April, 2011

David J. Kappos
*Director of the United States Patent and Trademark Office*